United States Patent
Yamada et al.

[15] 3,660,078

[45] May 2, 1972

[54] PROCESS FOR THE PREPARATION OF TITANIUM DIOXIDE CONCENTRATES

[72] Inventors: Shigeki Yamada, Kyoto; Kokichi Miyazawa, Shiga; Hideaki Naka, Shiga; Yoshio Yoshida, Shiga, all of Japan

[73] Assignee: Ishihara Sangyo Kaisha, Ltd., Osaka, Japan

[22] Filed: Feb. 9, 1970

[21] Appl. No.: 10,048

[30] Foreign Application Priority Data

Feb. 8, 1969 Japan......................................44/9012

[52] U.S. Cl.....................................75/101, 75/121, 75/108, 23/202
[51] Int. Cl. ...........................................C22b 53/00
[58] Field of Search.......................75/101, 108, 121, 2, 84; 23/202, 117, 87 T, 200

[56] References Cited

UNITED STATES PATENTS

| | | | |
|---|---|---|---|
| 2,127,247 | 8/1938 | Dawson et al. | 23/202 R |
| 2,301,412 | 11/1942 | Keats et al. | 23/202 R |
| 2,480,869 | 9/1949 | Mayer | 23/202 R |
| 2,622,013 | 12/1952 | Mayer | 23/202 R |
| 1,758,472 | 5/1930 | Schnetka | 23/202 R |
| 1,891,911 | 12/1932 | Brode et al. | 23/202 R |
| 3,464,791 | 9/1969 | Twist | 23/202 R |

*Primary Examiner*—L. Dewayne Rutledge
*Assistant Examiner*—G. T. Ozaki
*Attorney*—Sughrue, Rothwell, Mion, Zinn and Macpeak

[57] ABSTRACT

A process for the production of a titanium dioxide concentrate highly enriched with titanium dioxide and having low contents of other components comprising leaching a titaniferous material with a mineral acid in the presence of a seed material capable of accelerating the hydrolysis of titanium salts.

19 Claims, No Drawings

3,660,078

PROCESS FOR THE PREPARATION OF TITANIUM DIOXIDE CONCENTRATES

BACKGROUND OF THE INVENTION

1. Field of Invention

The present invention relates to a process for producing a titanium dioxide concentrate from a titaniferous material. More particularly, the invention relates to a process for producing a titanium dioxide concentrate highly enriched with titanium dioxide and having low contents of other components or impurities from a titaniferous iron ore such as ilmenite, leucoxene, arizonite, etc., or a material prepared by processing physically or chemically the aforesaid titaniferous iron ores.

2. Description of Prior Art

Industrial production of metallic titanium and titanium dioxide pigment by the chloride process includes a step of producing titanium tetrachloride by chlorinating a titanium-containing feed material and then removing impurities. However, in the interest of conserving expensive chlorine, higher grades of titanium-containing feed materials, such as naturally occuring rutile ores are generally employed. However, as the reserves of rutile ores are lessening and such ores have recently become almost exhausted, it has been attempted to prepare titanium dioxide concentrates by enriching titanium values in titaniferous iron ores such as ilmenite, which is rich in natural resources, although the content of titanium is lower.

Further, a large amount of naturally occuring rutile ore has hitherto been used as a raw material in the production of welding rods, but because of the aforesaid situation, it is necessary to employ titanium dioxide concentrates prepared from ilmenite instead of employing rutile ores.

Moreover, in the production of pigmentary titanium dioxide by the so-called sulfate process, titanium dioxide is prepared by a process including the step of dissolving ilmenite in concentrated sulfuric acid and thereafter removing excessive iron as crystals of iron sulfate. However, such a process is not always economically profitable, because a large quantity of concentrated sulfuric acid is required, and the use of a high grade of titanium dioxide concentrate has also been required in this field.

For the aforesaid purposes, various methods have been proposed to obtain a titanium dioxide concentrate by increasing the titanium value of a titaniferous iron ore such as ilmenite. For example, there has been suggested a process wherein the titanium content in a titaniferous iron ore such as ilmenite is increased by leaching the ore with a mineral acid and thereafter removing iron and other acid-soluble impurities therefrom by dissolution. Another process has been suggested wherein the titanium dioxide concentrate is obtained by producing molten iron and molten titaniferous slag concentrate from a titanium-containing iron ore and removing the iron values as metallic iron.

The above-mentioned mineral acid-leaching process is simple in operation, but is accompanied by the disadvantage that a higher grade titanium dioxide concentrate, e.g., higher than 80 percent by weight of titanium dioxide, is not readily obtained thereby under ordinary industrial conditions, particularly when a coarse-grained titaniferous material is employed.

SUMMARY OF THE INVENTION

Applicants have, however, discovered unexpectedly that when the titaniferous iron ore is subjected to such a mineral acid leach in the presence of a seed for accelerating the hydrolysis of titanium salt, the following advantages are obtained.

A. the rate of dissolution of the iron values from a titaniferous material such as ilmenite is increased, whereby a high grade titanium dioxide concentrate, which has never been readily obtained by conventional methods, can be obtained, and B. the formation of fines can be reduced in leaching and hence a high grade titanium dioxide concentrate having a desirable grain size can be obtained by selecting the proper grain size of the titaniferous feed material.

Accordingly, an object of the present invention is to provide a low cost and industrially simple process for producing a high grade titanium dioxide concentrate.

Another object of the present invention is to provide a process for producing a high grade titanium dioxide concentrate to be suitably used in the production of titanium tetrachloride, welding rods and titanium dioxide by the sulfate process.

Still another object of the present invention is to provide a process for producing a titanium dioxide concentrate possessing coarse grains by the treatment of a titaniferous material of coarse grain size.

A further object of the present invention is to provide a process for producing a titanium dioxide concentrate, which process can be easily performed and which is suitable for industrial practice.

As stated above, these objects can be attained by leaching a titaniferous material with a mineral acid in the presence of a seed for accelerating the hydrolysis of titanium salts and removing an iron-containing solution from the leached product.

DETAILED DESCRIPTION OF THE INVENTION

The aforesaid seed for accelerating the hydrolysis of titanium salts is one capable of accelerating the rate of hydrolysis of titanium salts such as titanium sulfate or titanium tetrachloride by their presence during the thermal hydrolysis of an aqueous solution of the titanium salt. They are generally employed in a colloidal state. As examples of such seed materials may be mentioned hydrated metal oxides having the aforesaid seed activity such as oxides of metals such as titanium, tin, niobium, tantalum, silicon, and the like.

The seed materials of the present invention may be prepared by, e.g., the following methods.

1. Colloidal hydrated metal oxide of titanium may be prepared by neutralizing an aqueous solution of a titanium salt such as titanium sulfate or titanium tetrachloride with ammonia or other alkaline material. In general, aging of the colloidal hydrated titanium oxide will improve the activity thereof.

2. Colloidal hydrated titanium oxide may also be prepared by partially neutralizing an aqueous solution of a titanium salt such as titanium sulfate or titanium tetrachloride followed by heating, or adding the aforesaid aqueous titanium salt solution to hot water after being preheated, whereby the titanium value is hydrolyzed.

3. Colloidal hydrated oxide of niobium or tantalum may be prepared by neutralizing an aqueous solution, e.g., an aqueous hydrofluoric acid-containing solution, of a niobium salt such as niobium pentachloride or a tantalum salt, such as tantalum pentachloride, with ammonia or other alkaline material. The activity of the colloidal hydrated metal oxide can generally be improved by aging.

4. Colloidal hydrated oxide of tin or silicon may be prepared (i) by adding a mineral acid to an aqueous solution of a stannate, such as sodium stannate, or a silicate, such as sodium silicate, or (ii) by adding the aqueous solution of the stannate or silicate to the system obtained by leaching a titaniferous material with a mineral acid.

Since the above processes are merely illustrative examples of preparing the aforesaid seed material to be used in the present invention, the seed materials used in this invention are not limited to those prepared by the above methods. Any materials having seed activity may be employed in the process of this invention. For example, the seed materials prepared by the processes described in Jelks Barksdale; "Titanium"; 2nd edition, pages 264–278, published in 1966 by The Ronald Press Company, New York may also be used. However, hydrated fine particle titanium dioxide formed by the leaching of a titaniferous material with a mineral acid has a low seed activity and is less suitably used as the seed material as it is obtained.

The required additive amount of the above-mentioned seed in the acid leaching reaction of this invention depends upon the nature of raw materials to be employed, the operating conditions for the leaching, etc., but the mole percent of the metal oxide in the seed to the $TiO_2$ content in the raw material is generally 0.1–10 percent, preferably 0.3–5.0 percent. This range depends, of course, on the activity of the seed material and the value of 0.1 mol percent indicated above is the lower limit in the case of employing seed material having a comparatively high activity. Other amounts of seed material than the aforesaid range may of course be employed, but if the amount is less than 0.1 mol percent, the effect is insufficient and the practical value thereof is reduced, while if the amount is higher than 10 mol percent, little further advantage is obtained by the increase in the proportion of the seed material which results in reducing the economical value of the process.

The proper period of addition of the seed material to the reaction system also depends on the operating period of the reaction, the operating temperature, the acid strength, the grain size of the raw material to be employed, and the properties of the desired concentrate. For example, when the operation period of the reaction is 6 hours, it is desirable to add the seed to the reaction system over a period of from the start of the reaction to 2–3 hours after the reaction is started.

The reaction mechanism of the present invention has not yet been clarified in detail but is considered to be as follows. That is, effect (A) mentioned above is considered to result from the fact that, while in the conventional method the concentration of titanium ions in the leach liquor increases as the concentration proceeds, which obstructs the dissolution of iron, in the case of adding the aforesaid seed material to the reaction system according to the process of this invention, the hydrolysis of titanium ions in the leach liquor is accelerated to extremely reduce the proportion of titanium ions in the liquid, thus eliminating obstruction by the titanium ions, whereby dissolution of iron is increased to provide the above-mentioned concentration effect.

Moreover, it is considered, in addition that, while in the case of leaching with hydrochloric acid by the conventional method, the phosphorous values of the titaniferous material used as the raw material is dissolved to obstruct the dissolution of the iron in the raw material, whereas in the case of adding the seed material to the reaction system according to the process of this invention, the phosphorous value thus dissolved out is removed by being absorbed on or precipitated with a small amount of the hydrolyzed product formed by the presence of the seed material, whereby the above-mentioned obstruction action by the phosphorous values in the conventional method can be eliminated to provide the desired concentration effect.

Further, effect (B) is perhaps caused by the immediate hydrolysis of the dissolved titanium values at the surface or the inside of the particles of the titaniferous material resulting from the presence of the seed material of this invention, whereby the original grain size of the feed material can be maintained.

By the action of the seed material, the rate of dissolution of the iron values can be increased by at least 5–15 percent, in some cases, more than 25 percent, as compared with the prior method. Moreover, as shown hereinafter in Example 3, it is possible to increase the rate several times over that of the conventional process. Furthermore, when the raw material has been concentrated to such extent that substantially no fine particles are formed and the concentrate is then leached with acid in the presence of the aforesaid seed material, effect (B), mentioned above, becomes more evident and, in this case, the yield of coarse-grained titanium dioxide concentrate having good fluidity (free flowing properties) is increased by, for example, about 10 percent as compared with the method wherein no seed material is added. Effects (A) and (B) vary according to the reaction conditions and hence the reaction conditions may be properly selected in accordance with the intended use of the titanium dioxide concentrate to be prepared.

Further, since the seed material of the present invention has the general effect of accelerating the hydrolysis of the titanium values, it has the advantage of reducing dissolution losses of the titanium values during the leaching step. This effect increases at the same time as does the yield of titanium dioxide concentrate and the grade of titanium dioxide in the concentrate.

By "titaniferous material" is meant (1) titaniferous iron ores, such as ilmenite, leucoxene, arizonite, etc., and (2) materials prepared by subjecting such titaniferous iron ores to chemical or physical processing.

As titaniferous material belonging to the latter classification, there may be mentioned, for example, (a) a material prepared by reducing substantially all of ferric oxide in the ore to ferrous oxide and (b) a material prepared by removing a portion of the iron values in such a titaniferous iron ore by acid leaching.

As titaniferous materials, there may be mentioned sand-type materials, obtained e.g., from a beach sand-type deposit, massive type materials obtained from rock deposits, and finely powdered materials obtained by grinding the above. When titaniferous material having a grain size of 20–200 mesh Tyler is used, coarse grain concentrate suitably employed for carrying out the chlorination thereof in a fluidized bed-type of operation can be obtained. When titaniferous material having a smaller grain size than 200 mesh Tyler is used, a high grade titanium dioxide concentrate can be obtained.

As the mineral acid used in the acid leaching of the process of this invention, there may be mentioned sulfuric acid, hydrochloric acid, or industrial wastes containing such acids, e.g., waste sulfuric acid from the production of pigmentary titanium dioxide by the sulfate process or a pickling waste acid. Adequate results can be obtained by using such an industrial waste acid containing sulfuric acid and therefore such wastes are suitable for the industrial practice of the present invention.

In general, the concentration of the acid employed in the acid leaching operation should be 100–600 g./liter, preferably 200–500 g./liter, based upon the concentration of free sulfuric acid, when sulfuric acid or waste sulfuric acid is employed and higher than 100 g./liter, preferably 150–300 g./liter based upon the concentration of free hydrochloric acid, when hydrochloric acid is employed. The process of this invention may of course be practiced at acid concentrations outside of the aforesaid range. However, if the concentration of the acid is lower than the above lower limit, the iron values are often not sufficiently dissolved in order to provide a high grade product or concentrate, while if the concentration of sulfuric acid is higher than 600 g./liter, the dissolution of titanium dioxide is increased, thus reducing the yield of the titanium dioxide concentrate. If the concentration of hydrochloric acid employed is higher than 300 g./liter, the process becomes uneconomical due to the high cost of such hydrochloric acid.

The acid leaching vessel may be of an open or closed type. The temperature of the acid leaching operation may be in the range employed in conventional methods. In particular, however, when the acid leaching is carried out at high temperatures in a closed-type vessel, the reaction time may be shortened and a higher grade titanium dioxide concentrate is obtained. The temperature will be, in general, desirably higher than 80° C. and better results are obtained as the temperature is increased. Usually, however temperatures over about 140° C. are not employed because of the resistance limitations of the vessels employed.

Moreover, the simultaneous presence of fluorine ions and/or a reducing material in the reaction system results in a preferable concentration effect. As the source of fluorine ions used in this invention, there may be mentioned hydrofluoric acid, ammonium fluoride, calcium fluoride, etc. As the reducing material of the instant invention, there may be mentioned materials capable of being dissolved in the leach liquor and capable of reducing a part or all of the ferric form of the iron present in the system to the ferrous form, such as metallic iron powder or a titanium (III) salt. When fluorine ions or reducing materials are employed they may be added to the reaction system together with, before or after the addition of the aforesaid seed material. In general, the proportions of fluorine ions and metallic iron present are 0.5–10 percent by weight and 0.5–15 percent by weight respectively based upon the total amount of the raw material. Further, in the case of employing other reducing materials, such as a titanium (III) salt, the amount thereof is equivalent to the amount of metallic iron employed as set forth above.

The solid residue obtained after removal of the iron values from titaniferous materials prepared by such acid leaching processing is a high grade titanium dioxide concentrate, which may be used for producing welding rods, for preparing titanium tetrachloride and for producing titanium dioxide by sulfate process.

When the reduction of the titaniferous material is conducted in the process of this invention, the reduction conditions required are only those severe enough to reduce the ferric form of the iron into the ferrous form and does not require the much severer conditions of reduction to metallic iron. Hence the present process is very economical.

The precise reduction conditions may be determined according to general reducing reactions and thus the reduction may be carried out by proper selection of reducing agent, time, temperature, and the like. As reducing agents which may be used in the present invention, there may be mentioned coal, charcoal, anthracite, activated carbon, coke, hydrogen gas, carbon monoxide, and the like. Other reducing agents, such as a mixture of carbon monoxide and hydrogen obtained by steam-reforming of a natural gas or naphtha, or a mixture of carbon monoxide and hydrogen obtained by partially oxidizing fuel oils may also be employed in the process of this invention.

The present invention will be further described by reference to the following illustrative examples. The compositions of the titaniferous iron ores used in the examples are shown in Table 1, in which Ore (1) and Ore (2) are from India, Ore (3) is from New Zealand, and Ore (4) is from Australia. They all possess grain sizes of about 20–200 mesh. The proportions of Table 1 and in all of the examples are given in percent by weight, unless otherwise indicated. The mesh sizes are given in Tyler standard.

TABLE 1

| Ore Component | (1) | (2) | (3) | (4) |
| --- | --- | --- | --- | --- |
| $TiO_2$ | 59.03 | 54.12 | 45.08 | 54.26 |
| Total Fe | 24.68 | 29.39 | 32.39 | 29.52 |
| FeO | 10.55 | 21.74 | 37.35 | 20.12 |
| $Fe_2O_3$ | 23.66 | 17.86 | 4.79 | 19.84 |
| MnO | 0.43 | 0.40 | 1.74 | 1.50 |
| CaO | 0.37 | 0.18 | 0.95 | 0.00 |
| MgO | 0.94 | 1.40 | — | 0.36 |
| $Al_2O_3$ | 1.06 | 1.15 | 2.44 | 1.08 |
| $V_2O_5$ | — | 0.21 | — | 0.13 |
| $P_2O_5$ | 0.17 | 0.13 | 0.18 | 0.07 |

Also, compositions of industrial waste sulfuric acid discharged from the hydrolysis step of the production of titanium dioxide by the sulfate process and used in the examples as a leaching acid are shown in Table 2, wherein proportions are given in g./l.

TABLE 2

| | Free sulfuric acid | Total Fe | $TiO_2$ |
| --- | --- | --- | --- |
| Waste sulfuric acid (A) | 275 | 41 | 5.6 |
| Waste sulfuric acid (B) | 350 | 37 | 8.2 |
| Waste sulfuric acid (C) | 450 | 38 | 8.9 |

The seed materials used in the following examples were prepared by the methods set forth below.

METHOD OF PREPARING SEED MATERIAL S-1

The seed material was prepared by acidifying a titanium sulfate solution with sulfuric acid to produce a solution having a concentration of 160 g./liter of $TiO_2$ neutralizing this solution with a 10 percent sodium hydroxide solution and then aging the resultant solution for 20 minutes at 80° C. The seed material obtained contained 38 g./liter of $TiO_2$.

METHOD OF PREPARING SEED MATERIAL S-2

This seed material was prepared by neutralizing with 10 percent sodium hydroxide, a solution of titanium tetrachloride which has been acidified with hydrochloric acid to produce a solution having a concentration of 160 g./liter of $TiO_2$. The seed material contained 34 g./liter of $TiO_2$.

METHOD OF PREPARING SEED MATERIAL S-3

This seed was prepared by neutralizing an aqueous sodium stannate ($Na_2SnO_3$), which had been acidified with 20 percent sulfuric acid at 80° C. to produce a solution containing 100 g./liter of $SnO_2$, aging the product for 20 minutes at the same temperature, and then cooling immediately. The seed material contained 80 g./liter of $SnO_2$.

METHOD OF PREPARING SEED MATERIAL S-4

The seed material was prepared by dissolving tantalum pentachloride in 55 percent hydrofluoric acid, neutralizing the resulting solution with an aqueous 6 percent ammonium hydroxide solution at 80° C., aging the product for 20 minutes at the same temperature and washing the product by decantation. The seed material thus prepared contained 95 g./liter of $Ta_2O_5$.

METHOD OF PREPARING SEED MATERIAL S-5

The seed material was prepared by the same procedure as in the case of preparing seed material S-4, substituting niobium pentachloride instead of tantalum pentachloride. It contained 95 g./liter of $Nb_2O_5$.

EXAMPLE 1

A mixture of 200 parts by weight of ore (1) and 10 parts by weight of petroleum coke was placed in a reactor and the system was heated to 900° C. for 1 hour in a muffle furnace to convert substantially all of the ferric iron therein to ferrous iron. After cooling the system while passing nitrogen gas there through, the excess coke or carbon was separated from the reduction product and the product thus obtained was used as the titaniferous material in the following experiment.

In an autoclave equipped with a stirrer and lined with lead were charged 200 g. of the titaniferous material prepared above, 600 ml. of waste sulfuric acid (B), and the seed material shown in the following Table 3. These materials were then reacted for 4 hours while maintaining the system at a temperature of 130° C. and at a pressure of 1.5 kg./sq. cm. gauge. On completion of the reaction, the reaction liquid was filtered. After air-drying the solid residue thus separated, the fines passing through a 200 mesh sieve were removed and the remaining coarse particle concentrate was calcined for 2 hours at 800° C. The analytical results of the products thus prepared are shown in Table 3.

The amount of seed material shown in Table 3, is expressed as the mol percent of the metal oxide in the seed material as compared with the titanium dioxide present in the aforesaid titaniferous material.

Further, the ratio of Fe dissolution in these tables is expressed as the weight percentage of the total iron dissolved as compared with the total iron contained in the aforesaid titaniferous material. The yield of $TiO_2$ therein is expressed as the weight percentage of titanium dioxide in the concentrate thus prepared compared with the titanium dioxide present in the titaniferous material.

TABLE 3

| Run Number | Seed Kind | Seed Amount | Ratio of Fe dissolution | TiO$_2$ yield | Coarse concentrate composition | | Weight, grams |
|---|---|---|---|---|---|---|---|
| | | | | | TiO$_2$ (wt. percent) | Total Fe (wt. percent) | |
| 1 | | | 47.6 | 96 | 73.7 | 17.2 | 161.5 |
| 2 | S-1 | 0.5 | 70.6 | 90 | 81.7 | 11.4 | 136.6 |
| 3 | S-1 | 1.0 | 78.6 | 87 | 84.5 | 9.1 | 126.9 |
| 4 | S-3 | 1.0 | 67.1 | 84 | 79.0 | 13.2 | 132.0 |
| 5 | S-4 | 1.0 | 78.5 | 96 | 82.0 | 11.5 | 145.4 |
| 6 | S-5 | 1.0 | 75.0 | 85 | 84.2 | 10.6 | 125.2 |

EXAMPLE 2

In a ball mill, ore (2) or (3) shown above was ground until 65% of the ore could pass a 325 mesh sieve. The ore thus ground was employed as the raw material in the following experiment.

In a four-necked flask equipped with a thermometer, a stirrer, and a reflux condenser was charged with 300 ml. of the waste sulfuric acid (C) shown in Table 2 and the system was then heated. When the temperature of the system reached 90° C., 100 g. of the aforesaid ground ore was added to the flask, and the contents of the flask were immediately brought to boiling. In the case of Control Run Nos. 7 and 10, the system was maintained at boiling for 6 hours and then the reaction was stopped. On the other hand, in the case of Run Nos. 8, 9, and 11, after boiling the system for 2 hours, seed material S-1 was added and the reaction system maintained for 4 more hours in a boiling state to conduct the reaction. Furthermore, in the case of Run No. 12, just before the system reached boiling, a metallic iron powder was added in an amount of 3 percent by weight to the weight of the raw material ore, seed material S-1 was added to the system after boiling for 2 hours and the system was then further reacted while being maintained at boiling for 4 hours. After the various reactions were completed, the reaction liquid was separated by filtration. By calcining the residue for 2 hours at 800° C., a titanium dioxide concentrate was obtained. The amounts of total Fe and total TiO$_2$ in the concentrate were determined and are shown in Table 4 below, wherein the various tabulated amounts are expressed on the same basis as in the case of Table 3, above, and wherein Runs 7, 8 and 9 relate to the use of ore (3) and Runs 10, 11 and 12 relate to the use of ore (2).

It will be noted that the yield of titanium dioxide was over 100% higher in some cases as a result of employing the titanium dioxide seed material.

TABLE 4

| Run No. | Additive amount of S-1 | Additive amount of iron powder | Ratio of Fe dissolution | TiO$_2$ yield | Concentrate composition (wt. percent) | |
|---|---|---|---|---|---|---|
| | | | | | TiO$_2$ | Total Fe |
| 7 | 0 | | 46.0 | 66 | 47.4 | 26.0 |
| 8 | 3 | | 70.0 | 96 | 65.5 | 13.7 |
| 9 | 5 | | 74.0 | 102 | 70.3 | 11.5 |
| 10 | 0 | | 44.0 | 75 | 59.5 | 24.2 |
| 11 | 2 | 0 | 48.5 | 94 | 64.1 | 20.8 |
| 12 | 2 | 3 | 59.0 | 98 | 70.6 | 15.8 |

EXAMPLE 3

In the ball mill was ground ore (3) until 70 percent could pass through a 325 mesh sieve and this ground ore was used as the raw material in the following experiment.

Into a four-necked flask equipped with a thermometer, a stirrer and a reflux condenser was charged 400 ml. of 20 percent hydrochloric acid and the system was heated. When the temperature of the hydrochloric acid reached 90° C., 100 g. of the ground ore was added to the flask, and then the reaction system in the flask was immediately brought to boiling. In Control Run No. 13, the reaction system was reacted as it was for 6 hours, while in Run No. 14 of the present invention, seed material S-2 was added to the reaction system when the system reached boiling and thereafter the system was reacted for 6 hours while maintaining the system in the boiling state.

The results are shown in the following table, wherein the various amounts are expressed as set forth above with regard to Tables 3 and 4.

TABLE 5

| Run Number | Amount of S-2 | Ratio of Fe dissolution | TiO$_2$ yield | Concentrate composition (wt. percent) | |
|---|---|---|---|---|---|
| | | | | TiO$_2$ | Fe |
| 13 | 0 | 14.9 | 90 | 45.5 | 30.4 |
| 14 | 1 | 98.8 | 95 | 82.4 | 2.3 |

EXAMPLE 4

A mixture of 100 parts by weight of ore (1) and 5 parts by weight of petroleum coke were placed in a reactor and the mixture was heated to 900° C. for 1 hour in a muffle furnace to substantially reduce the ferric iron present to ferrous iron. Thereafter, the product was cooled while passing nitrogen gas there through.

Into a lead-lined autoclave equipped with a stirrer was charged 2 liters of waste sulfuric acid (A) described in Table 2 and, after adding 400 g. of the reduced ore and 0.7 g. of seed material S-1(TiO$_2$), the system was reacted for 3 hours at 130° C. and at a pressure of 1.5 kg./sq. cm. gauge. After the reaction was completed, the reaction slurry was separated by filtration. After air-drying the solid residue thus obtained, the fine particles of the residue passing through a 200 mesh sieve were removed to provide 320 g. of a coarse product. The product was used as a titaniferous material in the following experiments.

a. Control Run No. 15

Into a lead-lined autoclave equipped with a stirrer was charged 600 ml. of waste sulfuric acid (C) described in Table 2 and after adding to the autoclave 160 g. of the titaniferous material prepared above, the system was reacted for 3 hours at 130° C. and at a pressure of 1.5 kg./sq. cm. gauge. After the reaction was completed, the reaction slurry was separated by filtration. After air-drying the solid residue, the product was sieved on a 200 mesh sieve into coarse particles and fine particles. Each of the coarse and fine particles were calcined for 2 hours at 800° C. to provide both a coarse concentrate and a fine concentrate. These concentrates were analyzed and the results shown in Table 6.

b. Run No. 16 (Process of this Invention)

Into a lead-lined autoclave equipped with a stirrer was charged 600 ml. of waste sulfuric acid (C) described in Table 2 and after adding 160 g. of the titaniferous material prepared above and seed material S-1, the system was reacted for 3 hours at 130° C. and at a pressure of 1.5 kg./sq. cm. gauge. After the reaction was completed, the reaction slurry was subjected to the same treatment as in the above control run No. 15. The results are also shown in Table 6, wherein the amounts are expressed as in percentages compared with TiO$_2$ or Fe present in the reduced ore instead of the titaniferous material as in Tables 3–5.

TABLE 6

| Run No. | Additive amount of S-1 in 2nd step | Ratio of Fe dissolution | TiO2 yield Coarse | TiO2 yield Fine | Concentrate composition (wt, percent) Coarse | | Fine | |
|---|---|---|---|---|---|---|---|---|
| | | | | | TiO2 | Total Fe | TiO2 | Total Fe |
| 15 | 0 | 87.0 | 85 | 15. | 87.4 | 5.6 | 92.7 | 0.5 |
| 16 | 0.5 | 88.8 | 94 | 11 | 90.1 | 4.4 | 94.5 | 0.8 |

EXAMPLE 5

A mixture of 100 parts by weight of ore (4) shown in Table 1 and 5 parts by weight of petroleum coke was charged into a reactor and the system maintained at 900° C. for 1 hour in a muffle furnace to substantially reduce the ferric iron to ferrous iron. The product was then cooled while passing nitrogen gas therethrough and ground in a ball mill until more than 65 percent thereof could pass a 325 mesh sieve. The ground product was used as the titaniferous material in the following experiment.

In a four-necked flask equipped with a thermometer, a stirrer and a reflux condenser was charged 300 ml. of waste sulfuric acid(C) described in Table 2 and the system heated. When the temperature of the waste sulfuric acid reached 90° C., 100 g. of the aforesaid titaniferous material was added and the content in the flask was immediately brought to boiling. In the case of Control Run No. 17, the system was reacted as it was for 6 hours while boiling, while in Experiment Nos. 18 and 19 of the present invention, after boiling the system for 2 hours, seed material S-1 was added and the reaction continued for an additional 4 hours while boiling. In the case of Run No. 20 of this invention, just before the system reached boiling, ammonium fluoride was added to the system in an amount of 5 percent by weight, based on the weight of the above-mentioned titaniferous material. Two hours thereafter, the aforesaid seed material was added and the system was then further reacted for 4 hours while boiling. After the reaction was completed, the product was treated as in Example 2, the results of which are shown in Table 7, wherein the various tabulated amounts are expressed in the same basis as in Tables 3–5.

TABLE 7

| Run number | Additive amount of S-1 | Additive amount of ammonium fluoride | Ratio of Fe dissolution | TiO2 yield | Concentrate composition (wt. percent) | |
|---|---|---|---|---|---|---|
| | | | | | TiO2 | Total Fe |
| 17 | 0 | 0 | 68.5 | 59 | 65.5 | 20.3 |
| 18 | 1 | 0 | 82.5 | 92 | 81.4 | 9.7 |
| 19 | 2 | 0 | 85.3 | 99 | 85.2 | 7.7 |
| 20 | 2 | 5 | 90.1 | 99 | 89.5 | 4.9 |

What is claimed is:

1. In a process for the production of titanium dioxide concentrate comprising leaching an iron-containing titaniferous material with a mineral acid, and separating the solid residue from the resulting iron-containing leaching solution to obtain a titanium dioxide concentrate, the improvement which comprises: leaching said iron-containing titaniferous material in the presence of a material which is ordinarily used as a seed for accelerating the hydrolysis of titanium salts.

2. The process of claim 1 wherein said material which is ordinarily used as a seed is a colloidal hydrated metal oxide.

3. The process of claim 2 wherein said material which is ordinarily used as a seed is present in the leaching system so that the molar percentage of the metal oxide in said material which is ordinarily used as a seed is present in an amount of 0.1–10 percent as compared with the titanium dioxide in said titaniferous material.

4. The process of claim 1 wherein said material which is ordinarily used as a seed is a colloidal hydrated titanium oxide.

5. The process of claim 1 wherein said material which is ordinarily used as a seed is a colloidal hydrated niobium oxide.

6. The process of claim 1 wherein said material which is ordinarily used as a seed is a colloidal hydrated tantalum oxide.

7. The process of claim 1 wherein said material which is ordinarily used as a seed is a colloidal hydrated tin oxide.

8. The process of claim 1 wherein said titaniferous material is a titaniferous iron ore.

9. The process of claim 8 wherein said titaniferous iron ore is an ore occuring in a beach sand-type deposit.

10. The process of claim 8 wherein said titaniferous iron ore is one having a particle size range of 20–200 Tyler standard mesh.

11. The process of claim 8 wherein the particles of said titaniferous iron ore are smaller than 200 Tyler standard mesh.

12. The process of claim 1 wherein said mineral acid is hydrochloric acid.

13. The process of claim 12 wherein said hydrochloric acid is employed at a concentration of 100–300 g./liter.

14. The process of claim 1 wherein said mineral acid is sulfuric acid.

15. The process of claim 14 wherein said sulfuric acid is employed in a concentration of 100–600 g./liter.

16. The process of claim 1 wherein said titaniferous material is prepared by reducing a titaniferous iron ore containing ferric iron such that substantially all of the ferric iron contained in such ore is converted into ferrous iron.

17. The process of claim 1 wherein said titaniferous material is prepared by the removal of a portion of the iron from a titaniferous iron ore by mineral acid-leaching.

18. The process of claim 1 wherein the leaching is additionally carried out in the presence of fluorine ions.

19. The process of claim 1 wherein the leaching is additionally carried out in the presence of a reducing agent.

* * * * *